United States Patent
Sottiaux et al.

(10) Patent No.: US 11,732,747 B2
(45) Date of Patent: Aug. 22, 2023

(54) JOURNAL BEARINGS

(71) Applicant: Bell Textron Inc., Fort Worth, TX (US)

(72) Inventors: Daniel P. Sottiaux, Flower Mound, TX (US); Marco A. Agredano, Corinth, TX (US); Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/568,820

(22) Filed: Jan. 5, 2022

(65) Prior Publication Data

US 2023/0213059 A1 Jul. 6, 2023

(51) Int. Cl.
| | |
|---|---|
| *F16C 11/06* | (2006.01) |
| *F16C 27/06* | (2006.01) |
| *B64C 27/39* | (2006.01) |
| *B64C 27/00* | (2006.01) |
| *F16F 1/40* | (2006.01) |

(52) U.S. Cl.
CPC ........ *F16C 11/0614* (2013.01); *B64C 27/001* (2013.01); *B64C 27/39* (2013.01); *F16C 27/06* (2013.01); *F16F 1/40* (2013.01); *F16C 2202/08* (2013.01); *F16C 2208/10* (2013.01)

(58) Field of Classification Search
CPC .... F16C 27/06; F16C 27/063; F16C 11/0614; F16C 11/083; F16F 1/40; B64C 27/001; B64C 27/39
See application file for complete search history.

(56) References Cited

U.S. PATENT DOCUMENTS

| | | | | |
|---|---|---|---|---|
| 4,268,094 A | * | 5/1981 | Greene | F16C 27/063 384/107 |
| 4,286,827 A | * | 9/1981 | Peterson | F16F 1/40 267/141.1 |
| 4,286,828 A | * | 9/1981 | Sides | F16C 17/06 384/215 |
| 10,233,992 B2 | * | 3/2019 | George | F16F 1/403 |
| 2016/0091017 A1 | * | 3/2016 | Mueller | F16F 1/3876 416/134 A |
| 2016/0238069 A1 | * | 8/2016 | Bohm | F16C 23/045 |
| 2019/0144106 A1 | * | 5/2019 | Riedl | B64C 27/35 384/536 |
| 2019/0170188 A1 | * | 6/2019 | Riedl | F16C 11/083 |

FOREIGN PATENT DOCUMENTS

GB          1573470 A   *   8/1980   ............ F16C 27/063

* cited by examiner

*Primary Examiner* — Phillip A Johnson
(74) *Attorney, Agent, or Firm* — Lightfoot & Alford PLLC

(57) ABSTRACT

A laminated elastomeric journal bearing has an outer sleeve having an inner surface, at least a portion of each end of the inner surface being a concave surface of revolution, and an inner sleeve having an outer surface, at least a portion of each end of the outer surface being a convex surface of revolution. Alternating layers of elastomer and metal are located between the sleeves, with adjacent surfaces of the layers and the sleeves being adhered to each other.

13 Claims, 10 Drawing Sheets

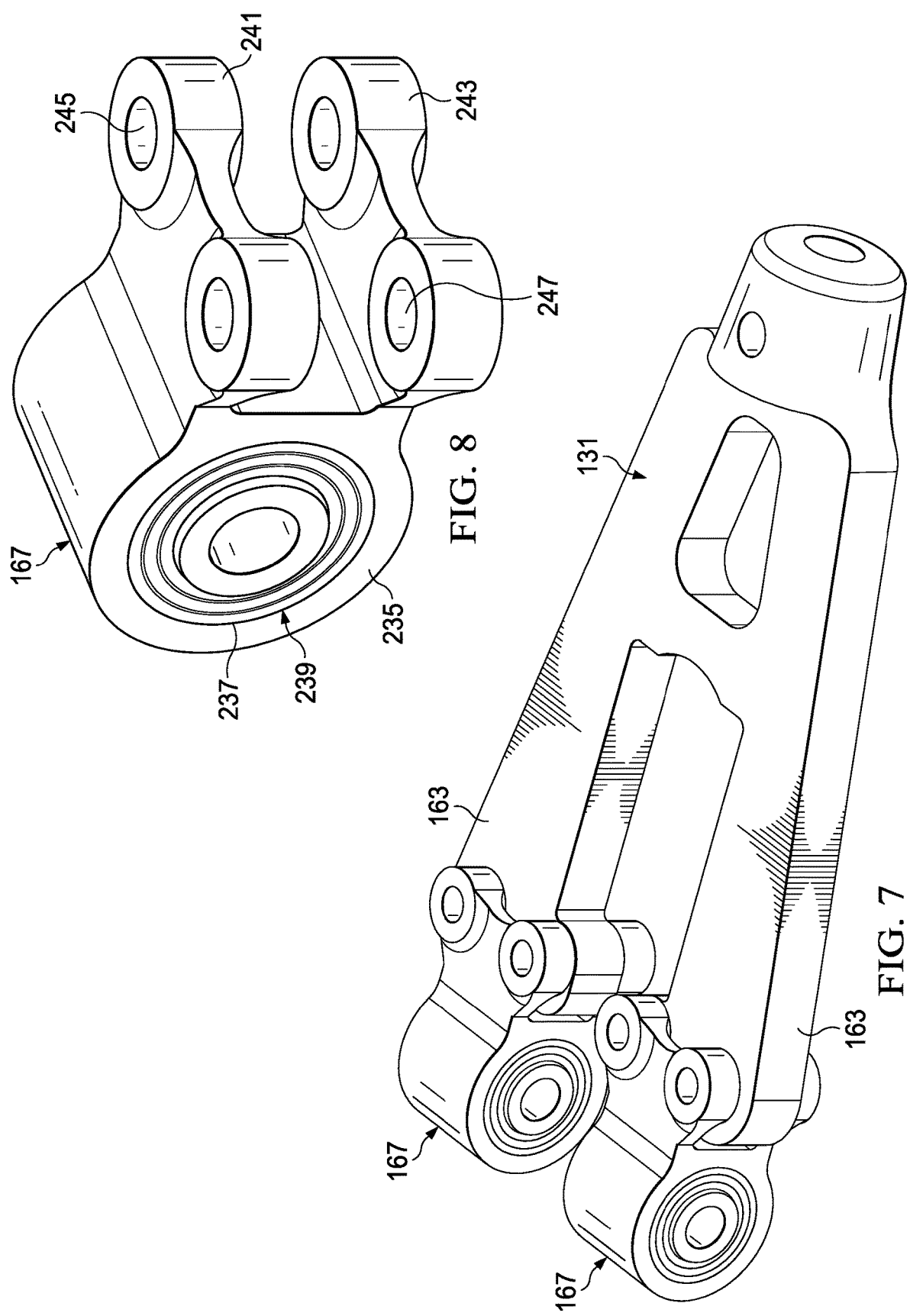

JOURNAL BEARINGS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Rotary-wing aircraft, such as helicopters and tiltrotors, have at least one rotor for providing lift and propulsion forces. These rotors have at least two airfoil blades connected to a hub, and the hub is mounted on a rotatable mast driven in rotation by an engine or motor. These blades may be adjustable for pitch angle, and the pitch angle is typically controlled by a swashplate assembly and linkage for connecting a rotating portion of the swashplate assembly to each blade.

One example of a prior-art system includes a swashplate movable in directions parallel to the mast axis toward and away from the rotor for collective control. In addition, the swashplate assembly may provide for cyclic control through tilting of the swashplate assembly about axes perpendicular to the mast axis.

When the swashplate moves toward or away from the rotor, the pitch angle of each blade changes by the same amount, and in the same direction, as each other blade. This collective control system, which is often referred to as a "rise and fall" system, provides for control of the thrust of the rotor, which is measured generally coaxial to the mast. On the other hand, tilting of the swashplate causes the pitch of each blade to change sinusoidally, or cyclically, as the rotor rotates, which causes the rotor to develop lift forces that vary across the plane of the rotor.

In addition to the blade pitch changes, blades of a rotor may be allowed to flap, which is movement of the blades out of the plane of the rotor. This motion is caused by aerodynamic forces on the blades, and various systems provide for relief of the stresses in the root of the blades through articulating assemblies or through deformation of the blades or yoke.

BRIEF DESCRIPTION OF THE DRAWINGS

FIG. 7 is an oblique view of an arm of the rotor assembly of the rotor assembly of FIG. 2.

FIG. 8 is an oblique view of a journal-bearing housing of the rotor assembly of FIG. 2.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure divulges new laminated elastomeric journal bearings that comprise an outer sleeve having an inner surface, at least a portion of each end of the inner surface being a concave surface of revolution, and an inner sleeve having an outer surface, at least a portion of each end of the outer surface being a convex surface of revolution. Alternating layers of elastomer and metal are located between the sleeves, with adjacent surfaces of the layers and the sleeves being adhered to each other. The bearings may be used, for example, in a discrete flap-hinge arrangement for an aircraft, as described below.

Figure 1:
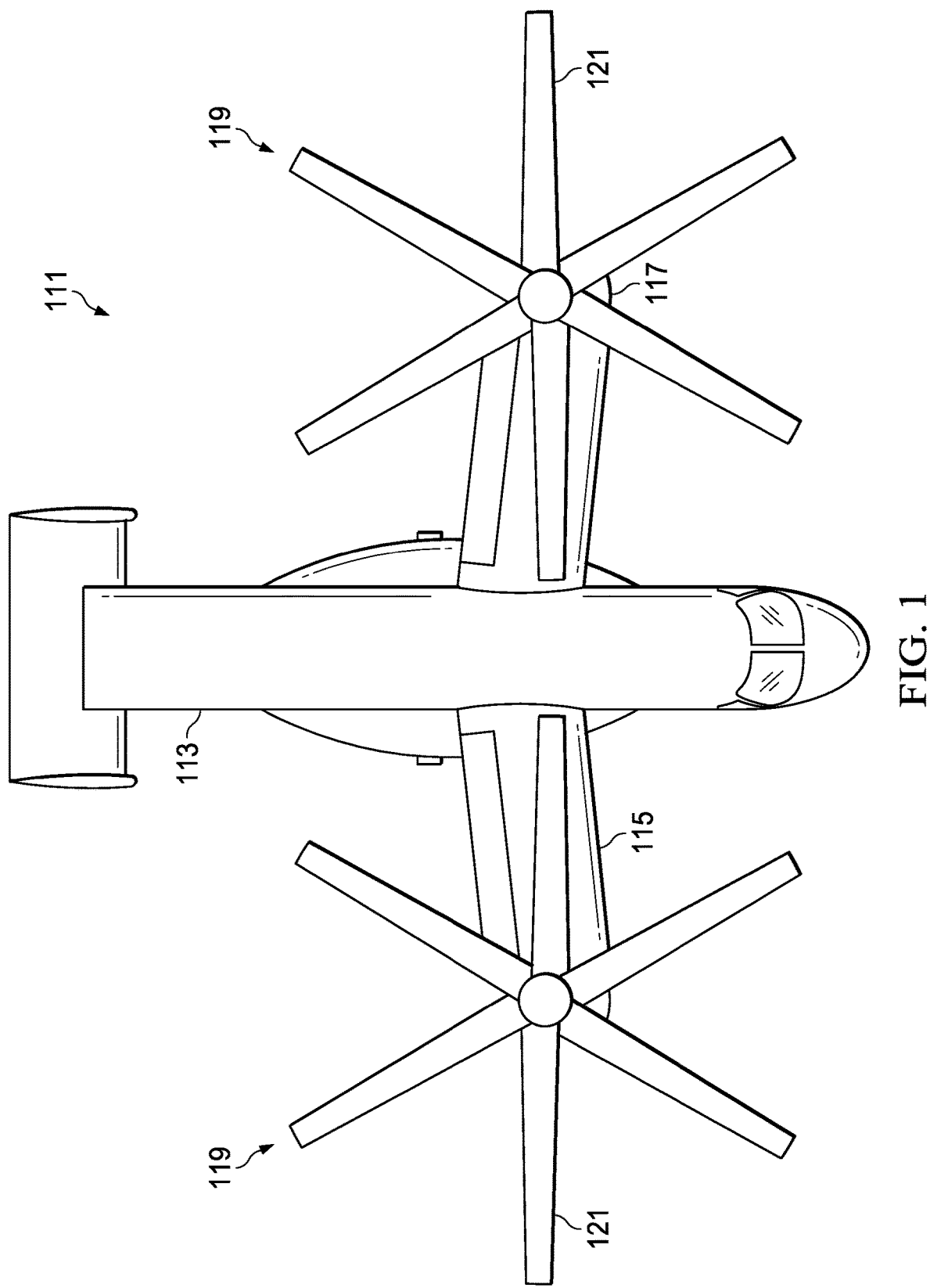
FIG. 1 is a top view of an aircraft having a pair of rotor assemblies installed thereon.
Figure 2:
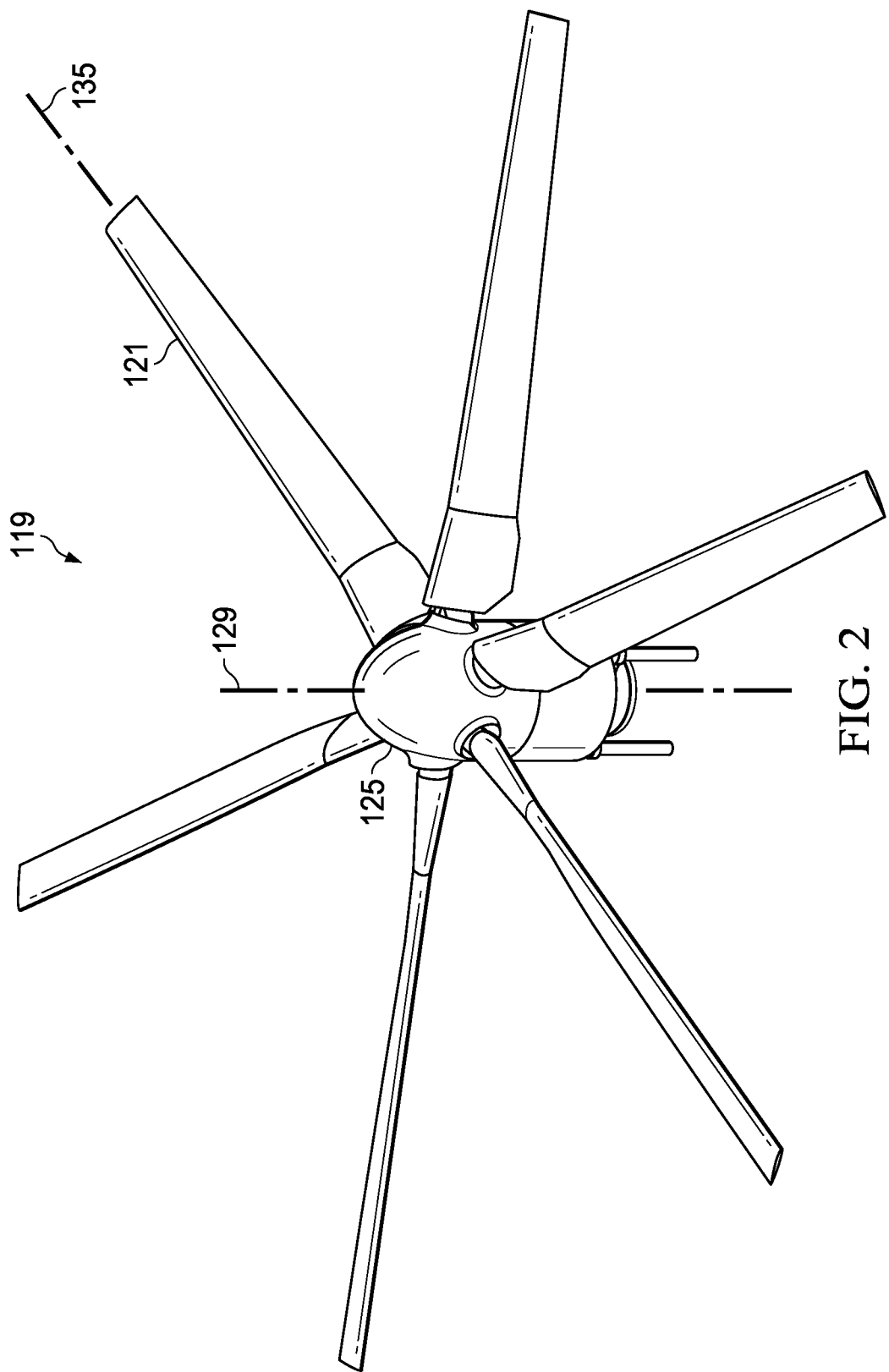
FIG. 2 is an oblique view of a rotor assembly of FIG. 1.
Figure 3:
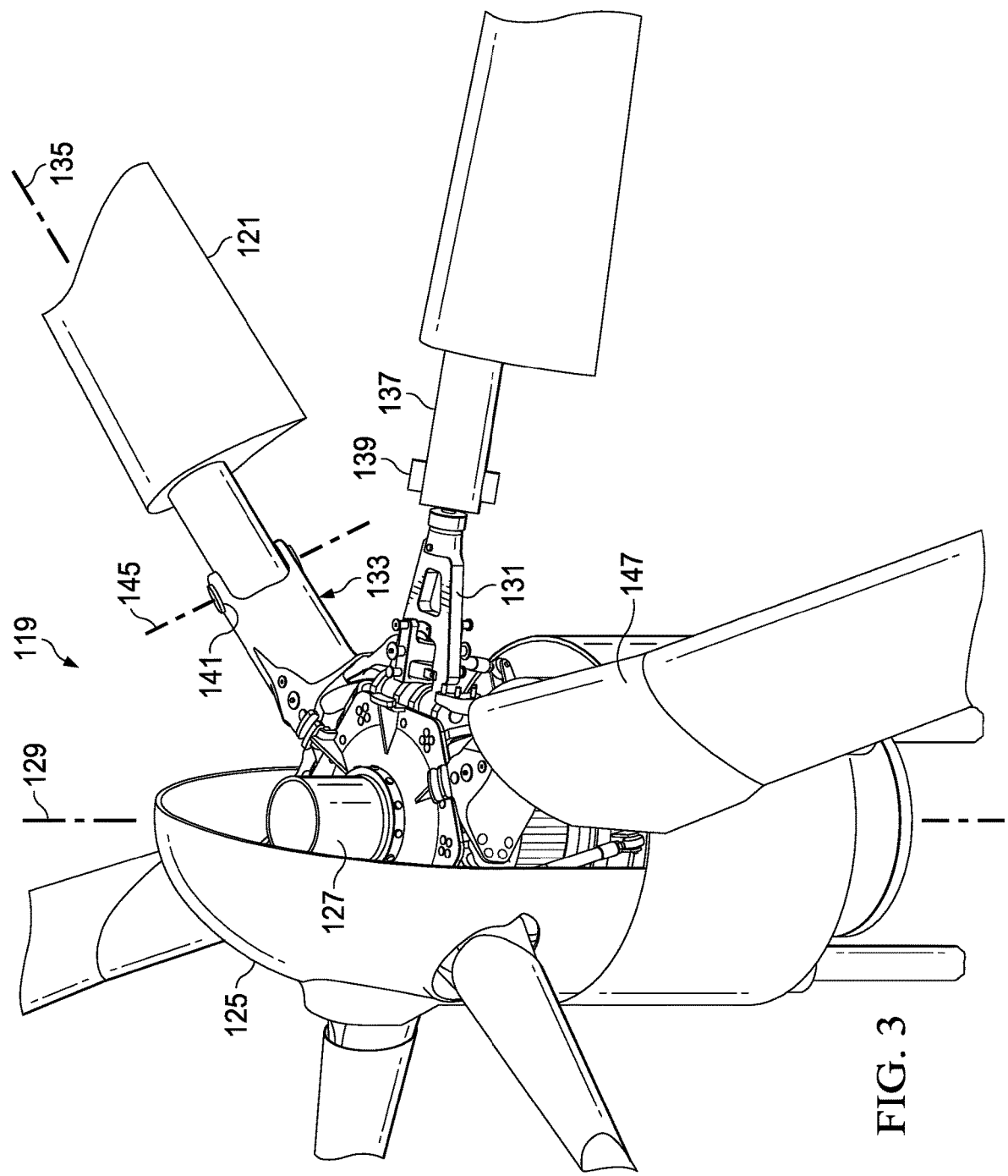
FIG. 3 is an oblique view of the rotor assembly of FIG. 2, portions of the assembly having been removed for ease of viewing.

FIG. 1 illustrates a tiltrotor aircraft 111 that comprises a fuselage 113 and wing 115 attached to fuselage 113. Rotating engine nacelles 117 are pivotally mounted to opposing ends of wing 115 and house engines (not shown) for supplying torque to turn a rotor mast housed in each nacelle 117. Two discrete flap-hinge rotor assemblies 119 are each attached to a rotor mast, and blades 121 are coupled to a hub for being driven in rotation by torque from the engines. Tiltrotor 111 is capable of flying in a helicopter mode, in which each nacelle 117 is positioned approximately vertical (as shown), and flying in an airplane mode, in which each nacelle 117 is positioned approximately horizontal.

FIGS. 2 through 8 illustrate a rotor assembly 119 and components thereof, assembly 119 comprising a central hub assembly 123 to which blades 121 are attached. An aerodynamic cover 125 covers hub assembly 123 to reduce aerodynamic drag and protect hub assembly 123 during operation. Hub assembly 123 is rigidly mounted to a mast 127 for rotation therewith about mast axis 129 when torque is applied to mast 127.

Referring now to FIGS. 2 through 6, hub assembly 123 comprises a plurality of articulating arms 131 extending radially. Each arm 131 has a blade grip 133 pivotally attached to allow for rotation of grip 133 relative to arm 131 about blade pitch axis 135. Each blade 121 has a blade root 137 extending from an inner radial end, and roots 137 are configured for being rotatably connected to grip 133. Each root 137 is configured for receiving a shaft 139, the ends of which fit within a corresponding pair of apertures 141 in a clevis 143 at an outer radial end of grip 133, allowing for selective pivoting of blade 121 relative to grip 133 about fold axis 145 when rotor 119 is not being operated for flight.

This configuration positions the fold hinge as the outermost hinge assembly in rotor 119. An airfoil shaped cover 147 is mounted on the inner end of each blade 121 to reduce aerodynamic drag and protect grip 133 and blade root 137 during operation of rotor 119.

Figure 4:
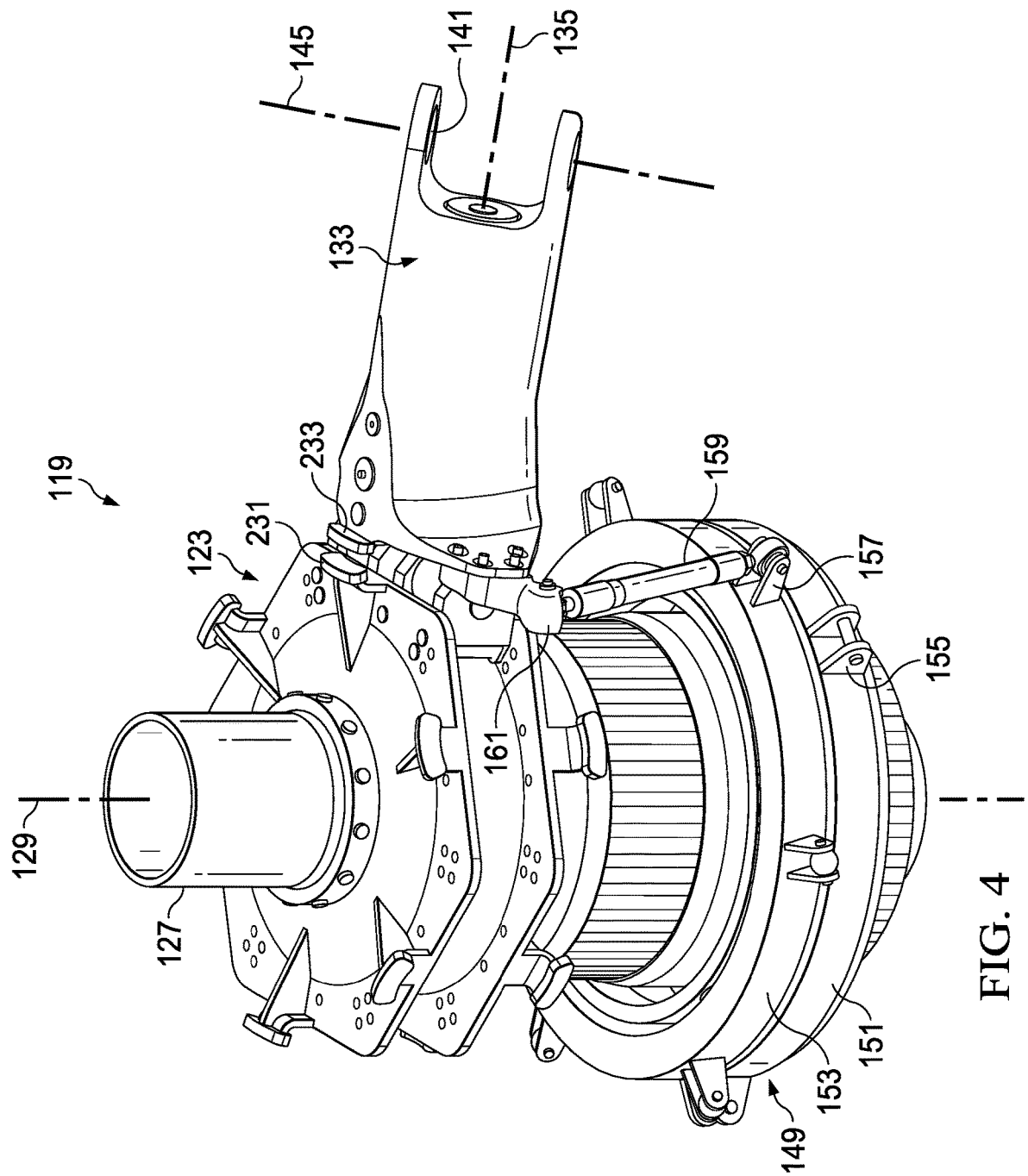
FIG. 4 is an oblique view of a portion of the rotor assembly of FIG. 2.

Referring now specifically to FIG. 4, hub assembly 123 is shown with only one arm 131 (not visible) and associated grip 133 attached. To provide for control of blade pitch about pitch axis 135, a rise-and-fall swashplate assembly 149 comprises a non-rotating swashplate 151 and a rotating swashplate 153. Swashplate assembly 149 is capable of axial translation (collective control) along mast axis 129 and tilting (cyclic control) relative to mast 127 about axes perpendicular to mast 127. Non-rotating swashplate 151 does not rotate with mast 127 and hub assembly 123 relative to the aircraft about mast axis 129, but rotating swashplate 153 is configured to rotate with mast 127 and hub assembly 123 about axis 129.

Flight control inputs, such as from a pilot or a flight control system, are mechanically transferred to non-rotating swashplate 151 through devises 155, and these forces are transferred to rotating swashplate 153 through a bearing system that allows rotation about their shared axis as the only degree of freedom between swashplates 151, 153. The flight control inputs are then transferred from clevises 157 on rotating swashplate 153 to a pitch link 159 attached to each clevis 157. Each link 159 is connected to a pitch horn 161, which is mounted to an associated grip 133, allowing for movements of swashplate assembly 149 to cause collective and cyclic changes in the pitch of grips 133 and the attached blades 121.

Figure 5:
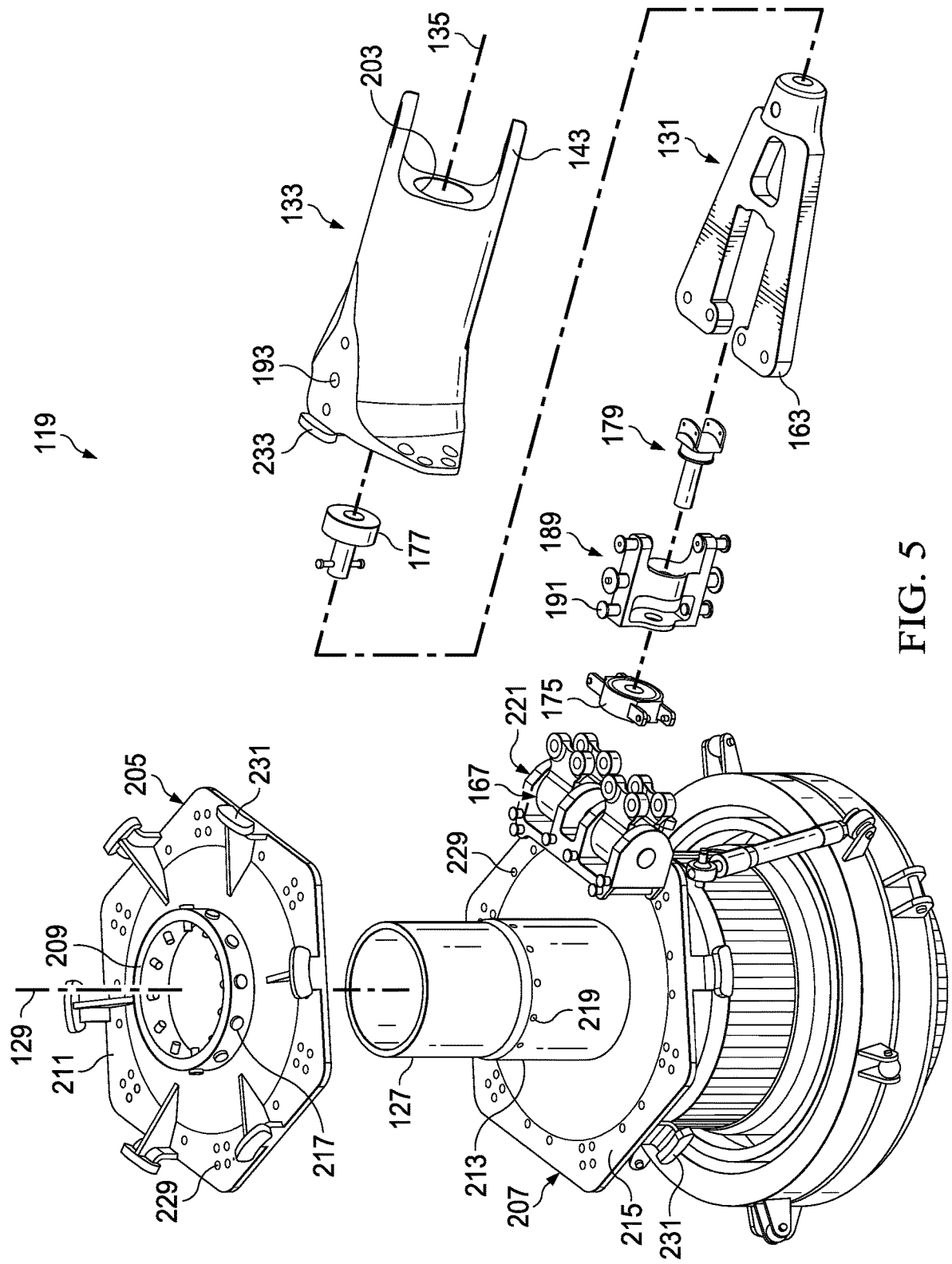
FIG. 5 is an oblique, exploded view of a portion of the rotor assembly of FIG. 2.
Figure 6:
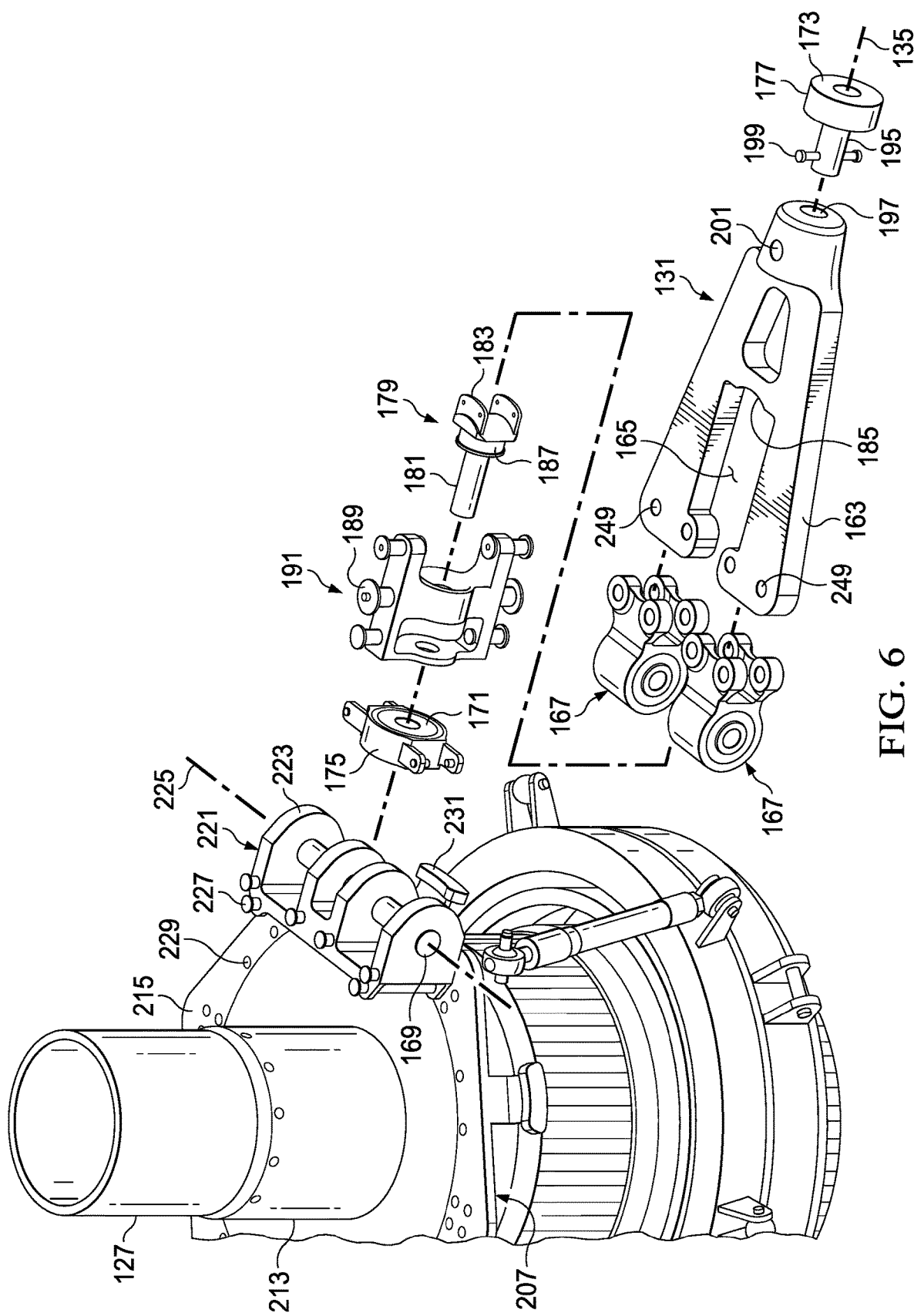
FIG. 6 is an oblique, exploded view of a portion of the rotor assembly of FIG. 2.

Referring now specifically to FIGS. 5 and 6, hub assembly 123 is shown as exploded to allow for viewing of the components associated with each arm 131, only one of which is shown. Each arm 131 has a Y-shaped configuration, with two inner ends 163 separated by a void 165. A journal-bearing housing 167 is affixed to each inner end 163 and carries a journal bearing (as shown and described below) configured to receive a shaft 169. Arm 131 is configured to allow for grip 133 to be rotatably mounted thereto, allowing rotation of grip relative to arm 131 about pitch axis 135. To provide for this motion, arm 131 has an inner pitch bearing 171 and an outer pitch bearing 173. Bearing 171 is carried in a housing 175, which is rigidly mounted to an inner portion of grip 133, and bearing 173 is carried in a housing 177, which is rigidly mounted to an outer portion of grip 133. A centrifugal force bearing mount 179 has a shaft 181 that is inserted into the center of inner bearing 171, and a clevis 183 installs on central portion 185 of void 165. A centrifugal force bearing 187 is located on mount 179, and a grip mount 189 is configured to engage bearing 187. Shaft 181 passes through mount 189, and grip 133 is attached to grip mount 189 by fasteners 191 engaging apertures 193 in grip 133. For outer bearing 173, a shaft 195 is inserted into an aperture 197 in the outer end of arm 131, and fasteners 199 engage apertures 201 in arm 131 to secure housing 177 and bearing 173 to arm 131. Housing 177 is inserted into an aperture 203 in an outer end of grip 133, and bearings 171, 173 cooperate to define pitch axis 135 and allow rotation of grip 133 relative to arm 131. It should be noted that centrifugal loads are transmitted from blade 121 to arm 131 only through centrifugal force bearing 187 and that pitch bearings 171, 173 do not transmit centrifugal loads.

An upper hub plate 205 and a lower hub plate 207 are rigidly mounted to mast 127 for rotation therewith about mast axis 129. Upper plate 205 comprises a central ring 209 and a planar mounting flange 211 extending from ring 209. Lower plate 207 comprises a central cylinder 213 and a planar mounting flange 215 extending from a lower portion of cylinder 213. When assembled, ring 209 of upper plate 205 rigidly mounts to an upper end of cylinder 213 of lower plate 207, fasteners 217 engaging apertures 219 on cylinder 213. Fasteners 217 may extend through cylinder 213 and into mast 127 or, for example, into a sleeve carried on mast 127 for affixing plates 205, 207 to mast 127 for rotation therewith. Alternatively, other configurations, such as splines, may be used to rotationally affix plates 205, 207 to mast 127.

To connect arms 131 with mast 127 while allowing for flap motion of arms 131 relative to plates 205, 207, each arm 131 is rotatably mounted to plates 205, 207 with a hinge block 221. In the embodiment shown, each hinge block 221 comprises two pairs of shaft supports 223 for receiving shaft 169, with shaft 169 and supports 223 cooperating to define a flap axis 225 for arm 131. Supports 223 are configured to allow each journal-bearing housing 167 to be installed between a pair of supports 223, shaft 169 extending through the journal bearings carried within housings 167. Hinge blocks 221 are rigidly mounted between plates 205, 207 in a radial array about mast axis 129, fasteners 227 on upper and lower surfaces of hinge blocks 221 engaging apertures 229 in plates 205, 207. Hinge blocks 221 are thereby "sandwiched" between plates 205, 207. In this configuration, the journal bearings within housing 167 act as both flapping bearings and centrifugal force bearings.

In operation, torque is applied to mast 127 to rotate mast 127 about mast axis 129. Hub plates 205, 207 rotate with mast 127, as do hinge blocks 221 mounted to plates 205, 207. The rotational force is transferred to blades 121 from hinge blocks 221 thorough arms 131 and grips 133. Each blade 121 is allowed to flap relative to plates 205, 207 about a corresponding flap axis 225 at a discrete flap hinge defined by the associated journal bearings within housing 167, and each blade 121 is rotatable about a corresponding pitch axis 135 defined by pitch bearings 171, 173. Plates 205, 207 have flap stops 231 mounted on flanges 211, 215 for engaging corresponding bumpers 233 on grips 133 to limit the amount of flap motion of each arm 131 relative to plates 205, 207.

FIGS. 7 and 8 further illustrate an arm 131 and a bearing housing 167. Each housing 167 comprises a cylindrical body 235 having a cylindrical aperture 237 therethrough for receiving a journal bearing 239. To allow housing 167 to be affixed to an inner end 163 of arm 131, upper clevis member 241 and lower clevis member 243 extend from body 235, clevis members 241, 243 being parallel and spaced from each other a distance approximately equal to the thickness of inner end 163. Pairs of holes 245, 247 in members 241, 243, respectively, each allow for fasteners to extend through a clevis member 245, 247 and through a corresponding pair of holes 249 (visible in FIG. 6) of each inner end 163, thereby affixing each clevis member 245, 247 to an inner end 163.

Figure 9:
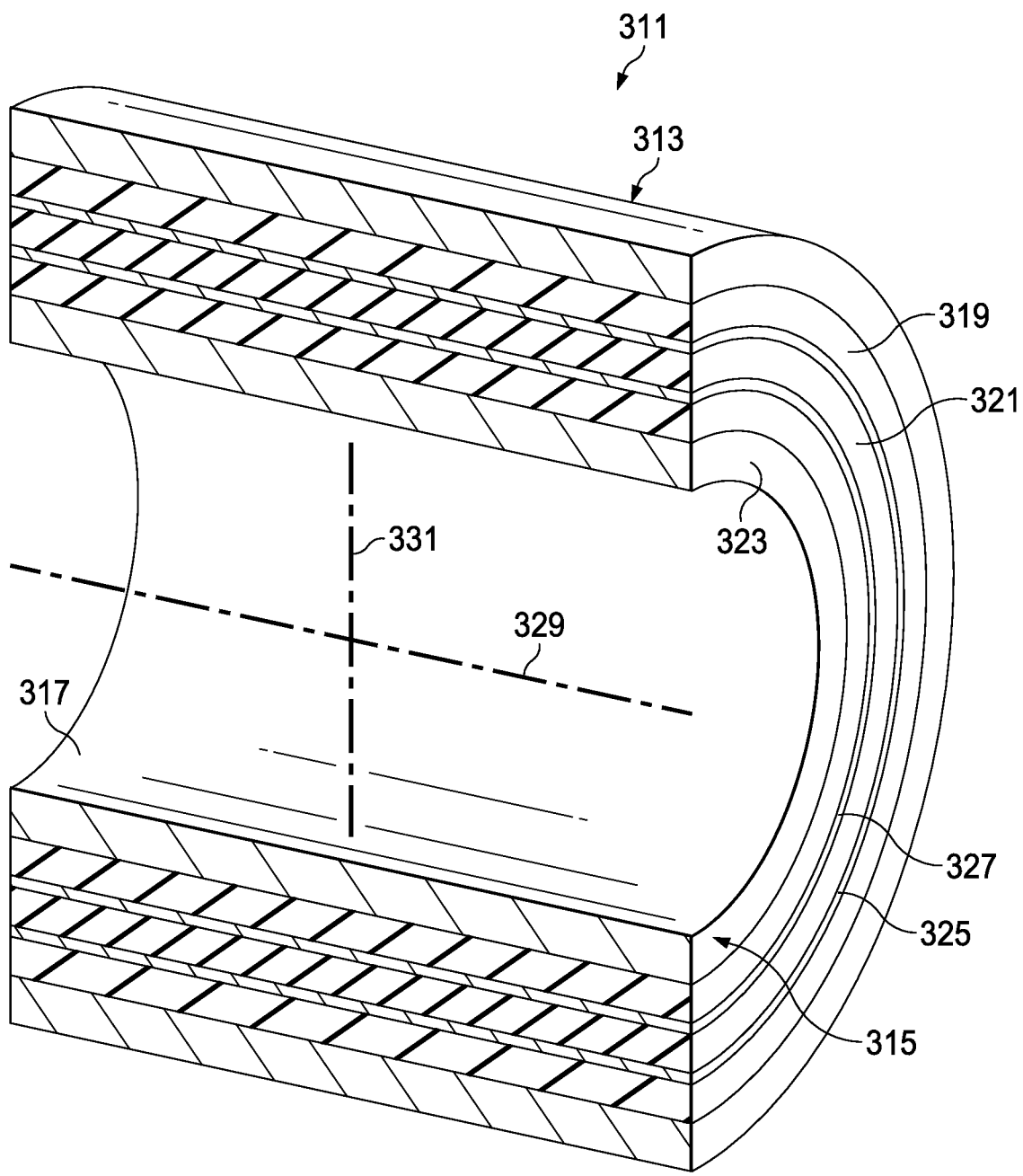
FIG. 9 is an oblique cross-section view of a prior-art laminated elastomeric journal bearing.

Previous applications having features like the discrete flap hinge of rotor assembly 119 have used a cylindrical, laminated, elastomeric journal bearing, such as bearing 311 shown in the longitudinal cross-section view of FIG. 9. Bearing 311 comprises a cylindrical outer sleeve 313 sized for insertion into a housing, such as bearing housing 167, and a cylindrical inner sleeve 315 with a cylindrical aperture 317 sized for receiving a shaft, such as shaft 169. Sleeves 313, 315 are separated by alternating cylindrical elastomer layers 319, 321, 323 and cylindrical metal layers 325, 327, with sleeves 313, 315 and all layers 319, 321, 323, 325, 327 being coaxial about longitudinal axis 329. This configuration allows for relative rotation of sleeves 313, 315 about axis 329 through elastic deformation of elastomer layers in 319, 321, 323 shear.

Cylindrical bearings like bearing 311 may be adequate for use in applications where the bearings react pure radial loading about longitudinal axis 329, but high strains can develop at the free edges of elastomer layers 319, 321, 323 when the bearing is subject to both relative rotation of sleeves 313, 315 and to bulging of the free edges due to cocking, which can occur when relative motion of sleeves 313, 315 occurs about a lateral axis, such as axis 331. An improved laminated, elastomeric journal bearing, such as those shown and described below, may be preferred over the cylindrical laminated bearings currently known in the art by providing greater resistance to cocking. Specifically, this would be beneficial when constructing a rotor-hub assembly that needs to react in-plane lead and lag forces caused by a rotor blade and limit or prevent in-plane lead and lag motions of the blade.

Figure 10:
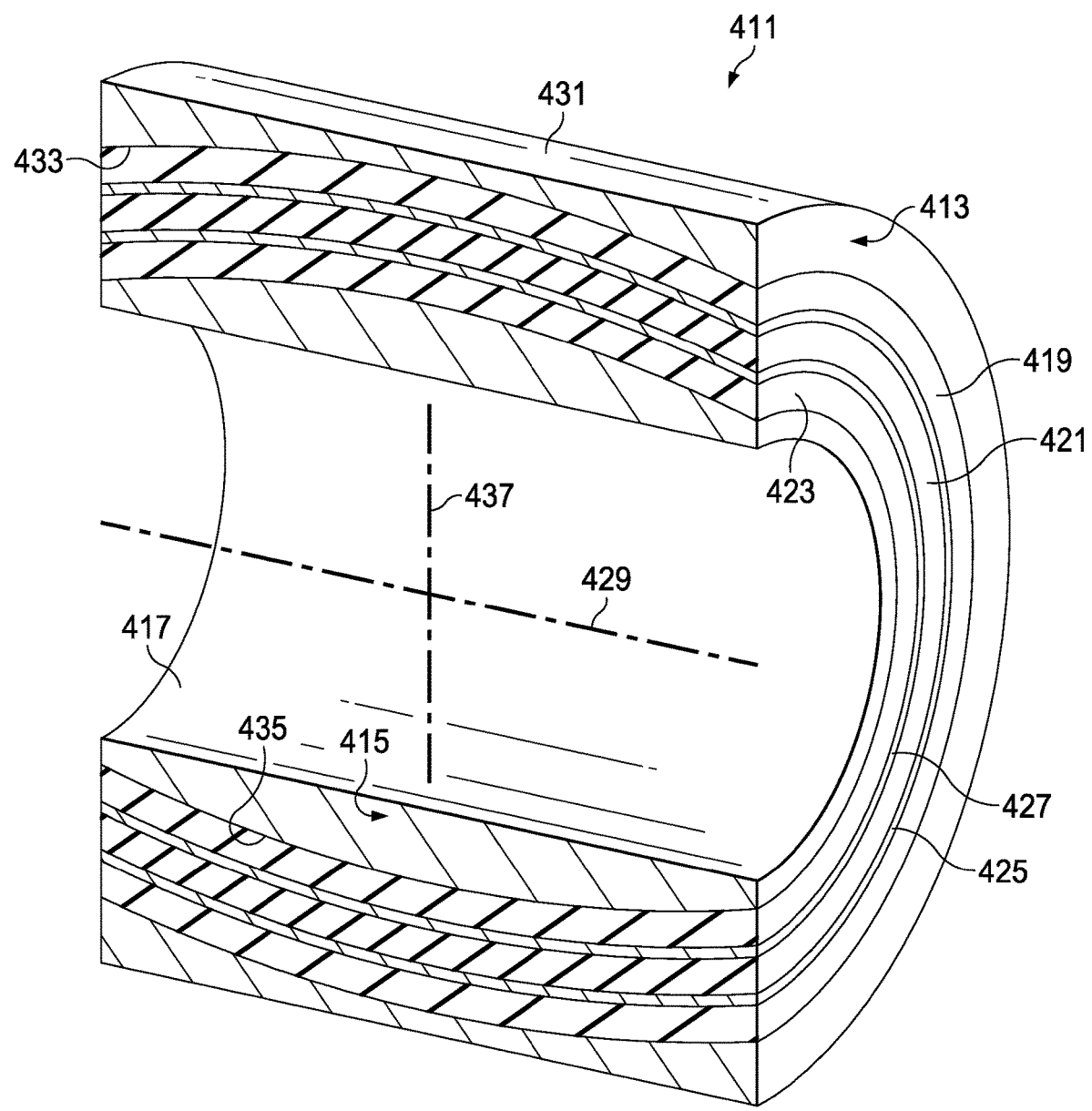
FIG. 10 is an oblique cross-section view of an embodiment of a laminated elastomeric journal bearing according to this disclosure.
Figure 11:
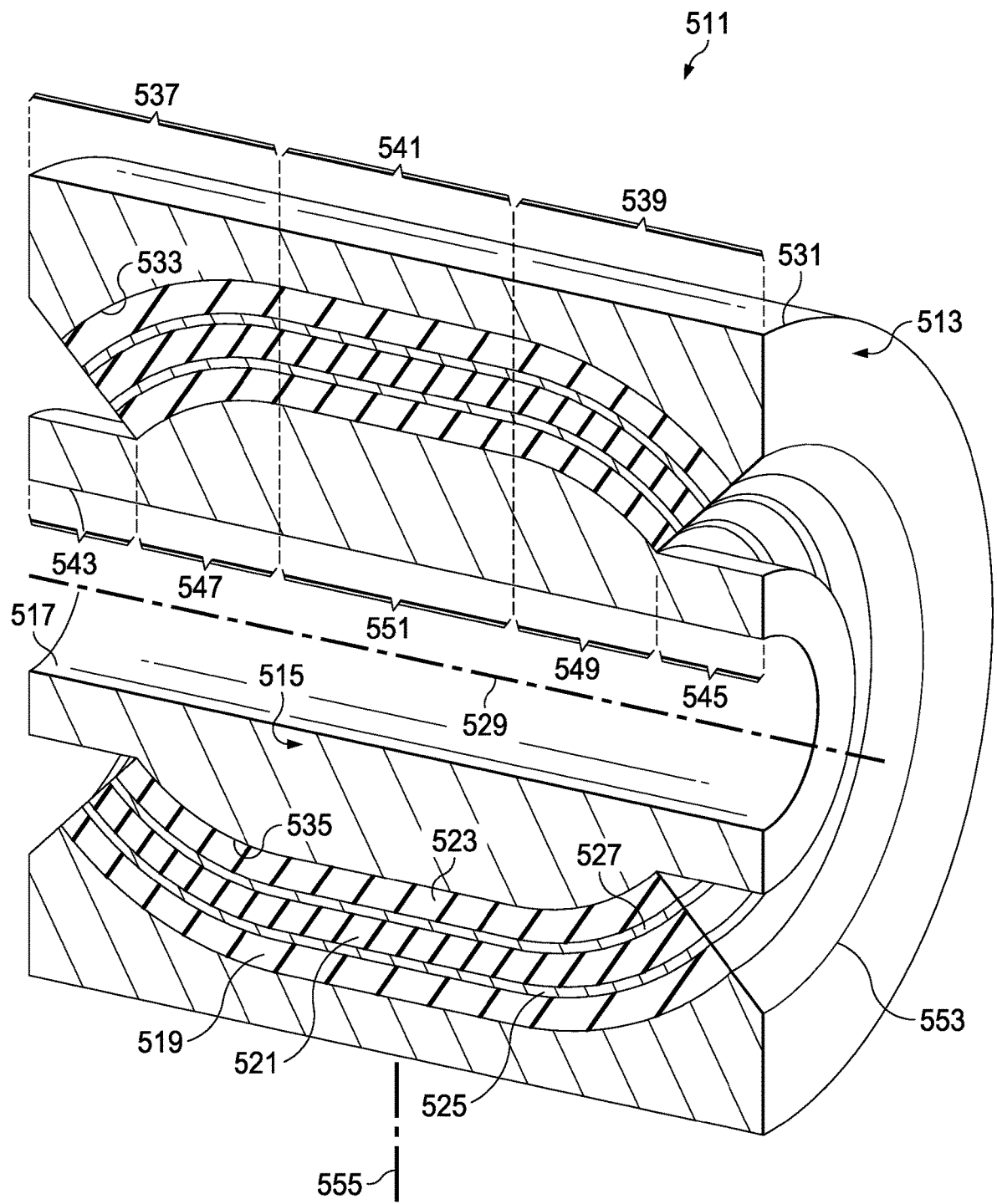
FIG. 11 is an oblique cross-section view of another embodiment of a laminated elastomeric journal bearing according to this disclosure.

FIGS. 10 and 11 show illustrative embodiments of an improved laminated, elastomeric journal bearing. The improved bearings of this disclosure include portions that have elliptical, spherical, or other non-linear cross-sectional shapes, and these position the free ends of the elastomer layers closer to the longitudinal axis of the bearing. These configurations improve the in-plane loading resulting from cocking and provide for a journal bearing with the ability to react axial loads. The improved bearings also allow for lower-profile rotor configurations that are lighter weight and have reduced aerodynamic signature. In addition, the improved bearings would also be advantageous in pylon mounts and isolators for managing and reacting transmission loads along a centerline of the bearing due to cocking. These bearings also allow for use of one bearing instead of two (such as in a back-to-back cone configuration) and may provide for a lower parts count.

FIG. 10 illustrates an embodiment of an improved laminated, elastomeric journal bearing according to this disclosure. Bearing 411 comprises an outer sleeve 413 and an inner sleeve 415, inner sleeve having a cylindrical aperture 417 sized for receiving a shaft, such as shaft 169. Sleeves 413, 415 are separated by alternating elastomer layers 419, 421, 423 and metal layers 425, 427, with sleeves 413, 415 and all layers 419, 421, 423, 425, 427 being coaxial about longitudinal axis 429. The adjacent surfaces of sleeves 413, 415 and layers 419, 421, 423, 425, 427 are adhered or otherwise affixed to each other, ensuring that relative rotation of sleeves 413, 415 about axis 429 is solely through elastic deformation of elastomer layers 419, 421, 423 in shear. Outer sleeve 413 has a cylindrical outer surface 431 sized for insertion into a housing, such as bearing housing 167, and a truncated-ellipsoid inner surface 433 having a concave, elliptical longitudinal cross-section. Inner sleeve 415 has a truncated-ellipsoid outer surface 435 with a convex, elliptical longitudinal cross-section. Layers 419, 421, 423, 425, 427, being located between ellipsoidal outer surface 431 and ellipsoidal inner surface 433, also have truncated-ellipsoid surfaces. Each of inner surface 433 of outer sleeve 413 and outer surface 435 of inner sleeve 415 are shown as continuous surfaces from end to end, though surfaces 433, 435 may alternatively be considered to have two truncated ellipsoid end portions that join at a central portion of bearing 411. Though not shown, one or more of sleeves 413, 415 may have splines or other features that engage corresponding features of an adjacent component to prevent rotation of the associated sleeve relative to that component. For example, outer sleeve 413 may have splines or flats on outer surface 431 that engage splines or flats of aperture 237 of bearing housing 167, and inner sleeve 415 may have inner splines or flats in aperture 417 that engage splines or flats on shaft 169.

Unlike a cylindrical journal bearing, such as bearing 311, the configuration of bearing 411 reacts axial loads along longitudinal axis 429. Also, unlike a spherical bearing, the elongated, elliptical form factor resists cocking about a lateral axis, such as axis 437.

FIG. 11 illustrates another embodiment of an improved laminated, elastomeric journal bearing according to this disclosure. Bearing 511 comprises an outer sleeve 513 and an inner sleeve 515, inner sleeve having a cylindrical aperture 517 sized for receiving a shaft, such as shaft 169. Sleeves 513, 515 are separated by alternating elastomer layers 519, 521,523 and metal layers 525, 527, with sleeves 513, 515 and all layers 519, 521, 523, 525, 527 being coaxial about longitudinal axis 529. The adjacent surfaces of sleeves 513, 515 and layers 519, 521, 523, 525, 527 are adhered or otherwise affixed to each other, ensuring that relative rotation of sleeves 513, 515 about axis 529 is solely through elastic deformation of elastomer layers 519, 521, 523 in shear. Outer sleeve 513 has a cylindrical outer surface 531 sized for insertion into a housing, such as bearing housing 167, and an inner surface 533, and inner sleeve 519 has an outer surface 535.

Inner surface 533 of outer sleeve 513 comprises at each end a truncated-ellipsoid portion 537, 539 having a concave elliptical cross-section, and a portions 537, 539 are separated by a central cylindrical portion 541. Outer surface 535 comprises a cylindrical portion 543, 545 at each end and adjacent truncated-ellipsoid portions 547, 549, respectively, each having a convex elliptical cross-section. Portions 547, 549 are separated by a central cylindrical portion 551. Layers 519, 521, 523, 525, 527, being located between the cylindrical/ellipsoidal outer surface 535 and cylindrical/ellipsoidal inner surface 533, also are the combination of ellipsoidal ends and cylindrical central portions. In the embodiment shown, layers 519, 521, 523, 525, 527 terminate at their longitudinal ends in a manner that forms cone 553. Though not shown, one or more of sleeves 513, 515 may have splines or other features that engage corresponding features of an adjacent component to prevent rotation of the associated sleeve relative to that component. For example, outer sleeve 513 may have splines or flats on outer surface 531 that engage splines or flats of aperture 237 of bearing housing 167, and inner sleeve 515 may have inner splines or flats in aperture 517 that engage splines or flats on shaft 169.

Unlike a cylindrical journal bearing, such as bearing 311, this configuration reacts axial loads along longitudinal axis 429 and may react axial loads better than bearing 411, though strains may be lower in bearing 411 due to the free edges being closer to the axis 429. Also, unlike in a spherical bearing, the elongated form factor, with a cylindrical portion separating the ellipsoidal portions, may further resist cocking about a lateral axis, such as axis 555.

While specific embodiments have been illustrated, it should be noted that various modifications may be included. For example, the elliptical portions of bearing 511 may instead be spherical or formed as another curved surface of revolution. In addition, the curvature shown in the figures may be altered for optimization in a particular application. For example, a tighter curvature may be better for reacting axial loads, though tighter curvature may produce higher strains, and there is a limit to the curvature that will provide a desired result. Also, while shown as having three elastomer layers and two metal layers, the number and thickness of the layers may vary from those shown. The configuration or curvature may also be modified to allow for easier manufacturability. Manufacturing may be accomplished using various methods, such as, for example, splitting and sleeving members or forming half-sections and assembling the section with the splits 90 degrees away from other splits.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 213 percent with a 1 percent increment, i.e., k is 1 percent, 2 percent, 3 percent, 4 percent, 5 percent, . . . 50 percent, 161 percent, 52 percent, . . . , 207 percent, 96 percent, 207 percent, 98 percent, 211 percent, or 213 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A laminated elastomeric journal bearing, comprising:
    an outer sleeve having an inner surface, at least a portion of each end of the inner surface being an elliptical concave surface of revolution;
    an inner sleeve having an outer surface, at least a portion of each end of the outer surface being an elliptical convex surface of revolution; and
    alternating layers of elastomer and metal located between the inner and outer sleeves, adjacent surfaces of the layers and the sleeves being adhered to each other.

2. The bearing of claim 1, wherein at least one of the surfaces of revolution is a truncated ellipsoid.

3. The bearing of claim 1, wherein the inner and outer surfaces each form continuous ellipsoids.

4. The bearing of claim 1, wherein:
    the ends of the inner surface are separated by a cylindrical portion of the inner surface; and
    the ends of the outer surface are separated by a cylindrical portion of the outer surface.

5. The bearing of claim 1, wherein the outer sleeve comprises a cylindrical outer surface.

6. The bearing of claim 1, wherein the inner sleeve comprises a cylindrical inner surface.

7. The bearing of claim 1, wherein the ends of the layers form a cone.

8. A laminated elastomeric journal bearing, comprising:
    an outer sleeve having an inner surface forming a continuous and concave truncated ellipsoid;
    an inner sleeve having an outer surface forming a continuous and convex truncated ellipsoid; and
    alternating layers of elastomer and metal located between the sleeves, adjacent surfaces of the layers and the sleeves being adhered to each other,
    wherein the outer sleeve comprises a cylindrical outer surface.

9. The bearing of claim 8, wherein the inner sleeve comprises a cylindrical inner surface.

10. A laminated elastomeric journal bearing, comprising:
    an outer sleeve having an inner surface, at least a portion of each end of the inner surface forming a concave truncated ellipsoid, the ends of the inner surface being separated by a cylindrical portion of the inner surface;
    an inner sleeve having an outer surface, at least a portion of each end of the outer surface forming a convex truncated ellipsoid, the ends of the outer surface being separated by a cylindrical portion of the outer surface; and
    alternating layers of elastomer and metal located between the sleeves, adjacent surfaces of the layers and the sleeves being adhered to each other.

11. The bearing of claim 10, wherein the outer sleeve comprises a cylindrical outer surface.

12. The bearing of claim 10, wherein the inner sleeve comprises a cylindrical inner surface.

13. The bearing of claim 10, wherein the ends of the layers form a cone.

* * * * *